June 27, 1933.  E. H. FRENCH  1,916,104
METHOD OF PURIFYING RESINS AND PRODUCT PRODUCED THEREBY
Filed Oct. 3, 1928
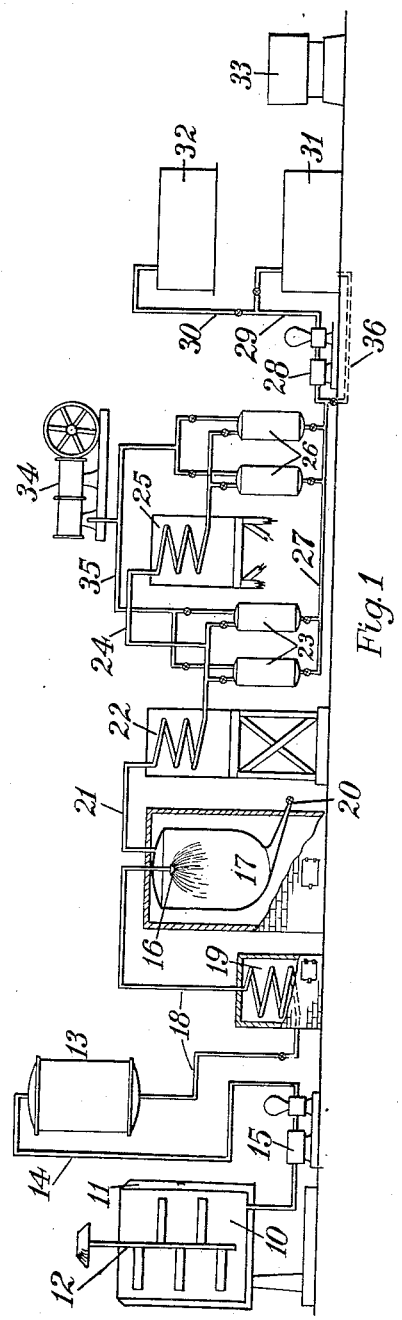
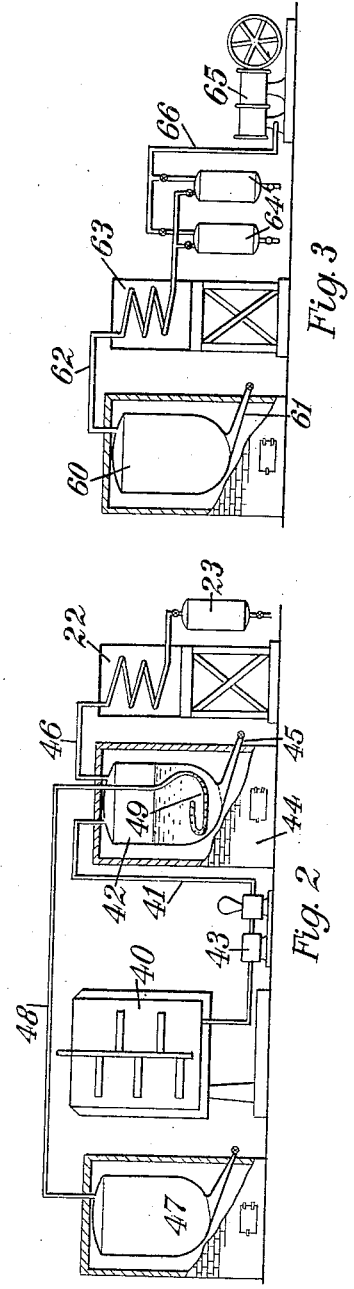
Edward H. French
Inventor
By Charles E. Howson, Atty.

Patented June 27, 1933

1,916,104

UNITED STATES PATENT OFFICE

EDWARD H. FRENCH, OF COLUMBUS, OHIO

METHOD OF PURIFYING RESINS AND PRODUCT PRODUCED THEREBY

Application filed October 3, 1928. Serial No. 310,111.

My invention relates to processes for the purification of resins and it is of special utility in connection with the purification of low-grade wood rosin, gum rosin and the like.

Among the chief objects of my invention are to provide in an improved manner for removing impurities from resins such as rosin without decomposing the resins; to provide in an improved manner for evenly distributing heat to a resin being distilled so as to avoid local superheating and the resultant injury to portions thereof; to provide an improved process in which the exposure of rosin to air is prevented during the time the rosin is at a temperature sufficiently high to be injured by contact with air; to provide in an improved manner for purifying rosin at a temperature below that at which decomposition of the rosin occurs; and to provide for obtaining from gum rosin or wood rosin a purified rosin or product of an unusually high grade as to color and which contains less than one-half the non-saponifiable matter contained in gum rosin of 162 acid number.

There are in use at present a number of known methods for recovering rosin from resinous softwoods, such as for example the gum process, the distillation process, the solvent process, the steam process, and the alkaline or wood-pulp process. Each of these processes excepting that last-named yields a rosin contaminated with various impurities such as rosin oil, pine oil, rosin pitch, tar, and impure turpentine; and the last-named process yields an alkaline resinate with impurities. For instance, in one distillation process softwoods are heated by direct fire in the presence of open steam to a temperature which melts the rosin in the wood and simultaneously volatilizes the turpentine. As the temperature rises, dissociation of the wood begins and destructive distillation products are formed, led away, and condensed. The tar and pitch remaining in the bottom of the retort has a smaller proportion of its rosin content in a state of decomposition than in other distillation processes.

In the past, unsuccessful efforts have been made to develope a process that will refine the crude rosin produced by these processes to a degree that will yield a rosin of a quality comparable with gum rosin obtained from the distillation of the exudations from resinous woods.

Commercial rosin or colophony as produced from the gum of the pine tree or as extracted from wood by any of the methods available is a mixture of abietic acid and certain non-saponifiable substances. The latter are present in varying amounts as indicated by the acid number of the rosin which ranges from 135 for some wood rosin to a general average of 162 for gum rosin, the latter figure indicating the impurities to be about 12%, if 302 is accepted as the molecular weight of rosin. The various commercial processes for producing rosin make necessary at least 12 different grades, selected according to color. Certain industries, such as the soap trade, the varnish trade, and the ester gum trade, all require the lighter grades. Efforts to refine rosin by vacuum distillation and the like to obtain these higher grades have given unsatisfactory results due to the fact that rosin is readily decomposed by heat, especially in the presence of air, and that because of its low heat conductivity and high boiling point it cannot be distilled successfully on a commercial scale even under a high vacuum without partial decomposition and a periodic superheating of portions of the rosin adjacent the side of the still, causing uneven distillation and "puking" of the still. Moreover the metal wall of the still in contact with the rosin acts, apparently catalytically, to increase the extent of the decomposition of the rosin.

My improved process enables me to overcome these difficulties and to suitably purify to an extent heretofore commercially impossible resins such as rosins containing substantial amounts of impurities and color as obtained from any of the well-known sources thereof. The invention is based upon the discovery that a high grade resin such as rosin can be distilled from crude material at temperatures below the temperature of decomposition of rosin and even below the distillation point of the rosin under high vacuum if the rosin and a liquid or rosin solvent having a relatively-high vapor pressure at atmospheric temperatures are heated together in a vacuum, or alternatively are heated and then brought into contact with each other in the presence of a relatively-high vacuum, the mixture being distilled in accordance with the operation of the well-known law of partial pressures. The invention is further based upon the discovery that surface superheating and the resultant injury to the rosin can be prevented by means of rapid agitation of the mixture during distillation and by introducing at least one of the components of the mixture into the other component in gaseous form while both are suitably heated.

In carrying out the process, the crude rosin is mixed with the vapors of a volatile liquid having a high vapor pressure at atmospheric temperatures, such as gasoline, benzol, toluol, kerosene, monochlorbenzene, or ethyl alcohol, or the like, preferably in the ratio of at least one volume of solvent to one volume of rosin, the temperature employed varying in accordance with the degree of vacuum, the relative amounts of solvent vapors and rosin used, and the vapor pressure of the latter. The distillation should however be carried out so as to avoid temperatures above 275° C., and temperatures around 240° C. are particularly suitable. For instance, the vapors of from 2 to 3 parts of gasoline to 1 part of rosin lowers the boiling point of the mixture, when under a vacuum of approximately 27.5 inches of mercury or more, sufficiently to distill over the rosin substantially undecomposed. The off-coming vapors of rosin and solvent are cooled sufficiently to condense the rosin and at least a part of the solvent, the balance of the latter passing along in vapor form for subsequent condensation. The rosin is then crystallized from the rosin-solvent mixture, separated from the mother-liquor, washed, and dried. The solvent is recovered and again used in the process.

In the accompanying drawing,

Figure 1 shows in elevation a form of apparatus for carrying out a preferred embodiment of my invention;

Figure 2 shows in side elevation a form of apparatus for carrying out a modification of my invention; and Figure 3 shows in side elevation a form of apparatus for carrying out another modification thereof.

Referring to Figure 1 of the drawing, 10 designates a tank provided with a heating jacket 11 and an agitator 12. A pressure-resistant storage tank 13 has its upper end connected to the bottom of the rosin-dissolving tank 10 by the pipe 14 having a pump 15 in the said pipeline between the two tanks. The bottom of the pressure tank 13 is connected through a pipe 18 with an atomizing spray head 16 positioned in the upper end of a still 17, the pipe 18 having a portion thereof formed into a coil and disposed within a preheating furnace 19. The still has a liquid outlet 20 in its bottom and has a vapor outlet pipe 21 leading from its top through a condenser 22 to a plurality of condensate receivers 23, 23. A vapor branch-line 24 leads from the pipe 21 adjacent the said receivers through a second condenser 25 to a pair of receivers 26, 26. The bottom of the receivers 23, 23, 26, 26, are connected together by pipe 27 which leads to one side of a pump 28, the other side of the pump 28 being connected by pipe 29 to a pipe 30 having its respective ends opening into a crystallizing tank 31 and into a solvent storage tank 32. A centrifuge preferably of the basket type or a filter press is shown at 33 adjacent the crystallizing tank. A vacuum pump 34 is connected by pipe 35 to the upper end of each of the receivers, and functions therethrough and through lines 24 and 21 to provide a high vacuum in still 17. A pipe-line 36 connects the crystallizing tank 31 with the inlet end of the pump 28 for pumping solvent from tank 31 to the storage tank 32.

In carrying out the modification of the invention shown in Figure 1, the rosin to be purified is mixed with the proper amount of a suitable solvent, preferably one having a vapor pressure higher than that of rosin, such as gasoline in tank 10, the dissolving of the rosin being facilitated by agitation or heating or both. This dissolving of the rosin serves to separate it from any solvent-insoluble impurities it may contain. The solution of rosin in the solvent is then pumped under pressure through the tank 13 and through the preheater 19 where it is heated to a temperature below that at which decomposition of the rosin will occur but high enough to cause the volatilization thereof and of the solvent when the solution is sprayed into the vacuumized still 17. The flowing, preheated solution is finally forced by the pump 15 to the spray nozzle or atomizer in the still 17 under a pressure which will vary according to the construction of the spray nozzles used. I have found that a pressure of about 20# per sq. in. on the solution is generally sufficient to give a suitable distribution thereof by the nozzles 16. Radiation losses between the preheater and the still, and those occurring in the latter are compensated for by heat applied to the still. As the solution is sprayed in finely divided form into the still 17 it flashes or volatilizes substantially instantaneously into vapor form as a result of the sudden release of pressure thereon and of the high temperature of the solution. Surface superheating of the rosin is thus avoided since the rosin is volatilized before appreciable quantities of the liquid contact with the still wall. The rate of vaporization is also greatly increased due to the great increase of the surface of the solution exposed to the action of the heat and vacuum. Any non-volatile residue remaining in the still may be drawn off through the bottom outlet 20.

The rosin-solvent vapors pass from the still to the condenser 22 which functions to cool the same sufficiently to condense therefrom the rosin together with an amount of solvent preferably about 25% to 50% of the amount of condensed rosin. This condensate flows to the receivers 23, 23, while the residual uncondensed solvent from condenser 22 passes to the condenser 25 where it is condensed and thence flows to the receivers 26, 26. Clogging of the condenser 22 and receivers 23 by rosin is avoided, due to the amount of solvent mixed therewith. The high-rosin-content distillate in the receivers 23, 23, is pumped therefrom to the crystallizing tank 31 where it is crystallized from the solvent by any known method for the crystallization of materials from their solutions, assisted or not by suitable heating, and with or without recovery of the solvent. The crystallized rosin is then separated from the mother liquor which is mostly solvent and may have small amounts of rosin oil and other impurities. The rosin is then transferred to the centrifuge 33 where it is washed with a suitable liquid such as petroleum ether, naphtha, or the like, and it is then dried. The distillate from receivers 26, 26, consisting principally of solvent, and also the solvent recovered from the crystallizing step, are pumped intermittently to the solvent storage tank to be used again in the process.

In the modification of the process illustrated in Figures 2, 40 designates a crude rosin melting tank having an agitator and a heating jacket similar to those of tank 10. A pipe 41 connects the bottom of tank 40 with the upper end of a still 42, a pump 43 being operatively interposed in the line 41 and adapted to pump liquid rosin from tank 40 to the still 42. The still is provided with a suitable heating means such as the brick setting 44 and with a bottom liquid outlet 45. A vapor outlet line 46 leads from the top of the still 42 through a condenser 22 to the receivers 23, 23, and to the other parts described in connection with the showing of Figure 1. A solvent still 47 has a vapor line 48 leading from its upper end and extending through the top of still 42 to a point near the bottom of the latter and terminating in a coil 49 having holes therein.

In practicing this modification of the invention, crude rosin is heated in tank 40 and is then pumped into still 42 in molten form. Simultaneously an amount of solvent is vaporized in still 47 and the vapors are conducted into the still 42 through pipe 48 and the holes in the coil 49, a high vacuum being maintained on both stills by means of the vacuum pump 34 (shown in Figure 1). The rate of distillation of solvent in still 47 and the rate of pumping the molten rosin into still 42 are preferably regulated to keep the solvent vapors and rosin in the ratio of about two or three parts of the former to one part of the latter. The solvent vapors entering the still 42 beneath the liquid level therein through the coil 49 agitate the rosin and prevent surface superheating and "boil-overs", while intimately mixing the solvent vapors and molten rosin, and providing for the exposure of a large surface of the mixture to the heating agency. The vapor pressure of the resultant solution of rosin in solvent under the vacuum existing in the still causes vaporization of the said solution, the vapors passing to the condenser 2 and to the subsequent apparatus shown in Figure 1, in which it is treated in the manner previously described.

The modification of the process shown in Figure 3 relates to an alternative method of treating the rosin-solvent solution normally obtained in the receivers 23. The apparatus employed includes a still 60 having a bottom liquid outlet 61 and an uper vaor outlet 62, the latter leading through a condenser 63 to the receivers 64, 64, the assembly including the still 60 being subjected to a high vacuum by a vacuum pump 65 directly connected to the receivers and the condenser through line 66.

In carrying out the process according to the modification shown in Figure 3, the rosin-solvent solution obtained by either of the modifications already described is transferred from the receivers 23 to the still 60 and heated therein to a temperature sufficient to distill off the solvent while being subjected to a high vacuum produced by the vacuum pump 65, the molten rosin thereafter being withdrawn from the outlet 61. This modification does not produce the high-grade product obtained from the first two modifications described, but it does produce a rosin that is superior to most of that now being marketed, and it makes available sources of rosin not commercially available under the methods employed prior to my invention.

The crystallization of rosin to secure my high-grade product is made possible by the distillation step, since it is not practicable to crystallize non-distilled rosin from organic solutions thereof, apparently because of the impurities therein which are removed by distillation. The crystallization of the rosin from the solvent and non-crystallizable impurities begins within a few hours after the cooling of the condensed rosin-solvent mixture has taken place. If the solvent such as gasoline is used in the proportion of one part thereof to four parts or more of rosin, the entire mixture upon crystallization becomes a mass of crystals wet with the solvent. These crystals can be separated from the solvent in a centrifuge, a filter press, or a suction filter, and can then be dried at temperatures below that at which decomposition of rosin begins. It is desirable to wash the crystals with petroleum ether, naphtha, or other suitable liquid, the said washing liquid then being employed in the process, so that any rosin dissolved in the washing liquid is recovered during a subsequent operation. The crystals when thus purified can be melted into a mass which has a color equal to or even superior to "X" grade rosin,—a high grade rosin,—and which has an acid number ranging from 178 to 185, indicating a very high degree of purity. This purified rosin is clearly superior to any of the commercial gum rosins, and it is especially adapted to the making of ester gum.

Other vapors such as steam can be used instead of a volatile solvent such as gasoline, but such vapors are usually less efficient than the latter, due in the case of steam to the fact that, being immiscible with rosin, it is difficult to prevent the condensed rosin from clogging the pipes and containers. When a vapor such as a hydrocarbon vapor is used, that portion thereof condensed with the rosin causes the latter to flow smoothly through the apparatus.

This application is a continuation in part of my co-pending application for United States Letters Patent, Serial No. 50,526, filed August 15, 1925.

My invention is capable of modification within the scope of the appended claims.

I claim:

1. The process of purifying crude rosin which comprises mixing the rosin with an organic volatile rosin solvent having a vapor pressure higher than that of rosin, and concurrently vaporizing the rosin and volatile solvent under vacuum for preventing substantial rosin decomposition.

2. The process of purifying crude rosin which comprises mixing the rosin with a water-insoluble rosin solvent having a higher vapor pressure than that of rosin, and concurrently vaporizing and distilling off rosin and solvent under vacuum for preventing substantial rosin decomposition.

3. The process of purifying crude rosin which comprises mixing the rosin with a water-insoluble organic rosin solvent having a higher vapor pressure than that of rosin, concurrently distilling the rosin and volatile solvent under high vacuum, and fractionally condensing from the resultant mixture of vapors a solution of rosin in the solvent.

4. The process of purifying crude rosin which comprises dissolving the rosin in an organic volatile rosin solvent having a vapor pressure higher than that of rosin, concurrently vaporizing the rosin and solvent of the resultant solution under high vacuum, and condensing and recovering at least the distilled rosin.

5. The process of purifying crude rosin which comprises concurrently vaporizing under vacuum rosin and a water insoluble organic volatile rosin solvent having a vapor pressure higher than that of rosin, and fractionally condensing from the resultant mixture of vapors a solution of rosin and solvent in the proportions of from 2 to 4 parts of rosin to 1 part of the solvent.

6. The process of purifying crude rosin which comprises the steps of vaporizing under vacuum a mixture of rosin and a volatile rosin solvent having a higher vapor pressure than that of rosin, and fractionally condensing from the mixture of vapors a solution of the rosin in a quantity of the solvent substantially less than the amount of rosin condensed.

7. The process as defined in claim 6 in which the relative amounts of rosin and solvent condensed are in the ratio of from 2 to 4 parts of the former to 1 part of the latter.

8. The process of purifying crude rosin which comprises the steps of vaporizing a mixture of rosin and an organic volatile solvent therefor having a vapor pressure higher than that of rosin, and fractionally condensing from the mixture of vapors therefrom a mixture of the rosin and a quantity of the solvent substantially less than the amount of rosin used, and carrying out the said steps in the presence of a high vacuum.

9. The process of purifying crude rosin which comprises mixing the rosin with a volatile rosin solvent having a higher vapor pressure than rosin, heating the mixture below the temperature of decomposition of rosin, and flash-vaporizing the mixture under vacuum.

10. The process of purifying crude rosin which comprises vaporizing under vacuum a mixture of rosin and a hydrocarbon having a higher vapor pressure than rosin, and fractionally condensing from the resultant vapors a solution of the rosin in a quantity of the hydrocarbon substantially less than the amount of rosin present in the said condensate.

11. The process as defined in claim 10 in which the relative amounts of rosin and the hydrocarbon so condensed are in the ratio of from 2 to 4 of the former to 1 of the latter.

12. The process of purifying crude rosin which comprises vaporizing the rosin under vacuum in contact with the vapors of an organic volatile rosin solvent having a higher vapor pressure than rosin, fractionally condensing from the distilled vapors a mixture of rosin and the said liquid with the latter of rosin in an amount substantially less than the amount of rosin condensed, and crystallizing from the said mixture the rosin contained therein.

13. The process of purifying crude rosin which comprises the steps of vaporizing the rosin under high vacuum in the presence of the vapors of an organic volatile rosin solvent having a vapor pressure higher than that of rosin, and crystallizing the distilled rosin from a solution thereof in a volatle solvent therefor.

14. The process of purifying crude rosin which comprises the steps of vaporizing the rosin under vacuum in the presence of the vapors of a hydrocarbon having a vapor pressure higher than that of rosin, condensing the rosin and at least a portion of the hydrocarbon to form a rosin solution, and crystallizing the distilled rosin from the said solution.

15. The process of purifying crude rosin which comprises dissolving the said rosin in an organic rosin solvent, separating undissolved matter from the resultant solution, preheating the said solution to a temperature capable of distilling the solution substantially undecomposed when the latter is subjected to high vacuum, atomizing the preheated solution within a vacuumized chamber thereby distilling the solution under reduced pressure, and condensing the distilled rosin.

16. The process of purifying crude rosin which comprises dissolving the said rosin in an organic rosin solvent, separating undissolved matter from the resultant solution, preheating the said solution to a temperature not higher than 275° C. but capable of distilling the rosin substantially undecomposed when the solution is subjected to high vacuum, atomizing the preheated solution within a vacuumized chamber thereby distilling the solution under reduced pressure, and condensing the distilled rosin.

17. The process as defined in claim 16, in which the rosin is condensed the presence of a substantial portion of the said solvent.

18. The process of purifying crude rosin which comprises dissolving the said rosin in an organic rosin solvent, separating undissolved matter from the resultant solution, preheating the said solution to a temperature around 240° C., atomizing the preheated solution within a vacuumized receptacle thereby distilling the solution under high vacuum, and condensing the distilled rosin in the presence of a quantity of the solvent substantially less than the amount of rosin condensed.

19. The process of purifying crude rosin which comprises vaporizing the said rosin in the presence of vapors of a voltatile rosin solvent under high vacuum and at a temperature capable of distilling the same substantially undecomposed, and condensing the distilled rosin in the presence of a substantial quantity of the said solvent.

20. The process of purifying crude rosin which comprises vaporizing rosin under vacuum in the presence of the vapors of a water-insoluble volatile rosin solvent having a vapor pressure higher than that of rosin, condensing rosin and at least a portion of the said solvent to form a rosin solution, and crystallizing the rosin from the said solution.

21. The process of purifying crude rosin which comprises bringing into intimate contact with the rosin under vacuum the vapors of a water-insoluble rosin solvent having a vapor pressure higher than that of rosin, thereby vaporizing rosin in the presence of the said solvent vapors, condensing rosin and at least a portion of the said solvent to form a rosin solution, crystallizing the rosin from the said solution, and separating the crystallized rosin from the residue.

22. The process of purifying crude rosin which comprises dissolving the said rosin in a water-insoluble organic rosin solvent having a vapor pressure higher than that of rosin, separating undissolved matter from the resultant solution, preheating the solution to a temperature at which the rosin distills substantially undecomposed when the solution is subjected to high vacuum, atomizing the preheated solution within a vacuumized chamber thereby distilling the rosin and solvent under reduced pressure, condensing the distilled rosin in the presence of a quantity of the solvent substantially less than the amount of rosin condensed, and crystallizing the rosin from the resultant solution.

23. The process of purifying crude rosin which comprises dissolving the said rosin in a hydrocarbon rosin solvent having a vapor pressure higher than that of rosin, separating undissolved matter from the resultant solution, preheating the solution to a temperature at which the rosin distills substantially undecomposed when the solution is subjected to a high vacuum, atomizing the preheated solution within a vacuumized chamber thereby vaporizing the rosin and solvent under reduced pressure, condensing the distilled rosin together with a portion of the hydrocarbon solvent substantially less than the amount of rosin condensed, crystallizing the rosin from the resultant condensate, and recovering the crystallized rosin.

24. The process of purifying crude rosin which comprises preheating a solution of rosin in an organic volatile rosin solvent having a vapor pressure higher than that of rosin, to a temperature at which the rosin vaporizes substantially undecomposed when the solution is subjected to high vacuum, atomizing the preheated solution within a vacuumized chamber thereby vaporizing the rosin and solvent under reduced pressure, condensing the vaporized rosin in the presence of a quantity of the said solvent substantially less than the amount of rosin condensed, crystallizing the rosin from the resultant solution, and recovering the crystallized rosin.

In witness whereof I have hereunto set my hand this first day of October, 1928.

EDWARD H. FRENCH.